United States Patent [19]

Merkel

[11] 4,136,753
[45] Jan. 30, 1979

[54] VEHICLE POWER STEERING SYSTEM
[75] Inventor: Stephen F. Merkel, Painesville, Ohio
[73] Assignee: Fluid Controls, Inc., Mentor, Ohio
[21] Appl. No.: 767,827
[22] Filed: Feb. 11, 1977
[51] Int. Cl.² ............................................. B62D 5/08
[52] U.S. Cl. ..................................... 180/133; 60/403; 180/152
[58] Field of Search ............... 180/133, 139, 152, 153; 60/403

[56] References Cited
U.S. PATENT DOCUMENTS

| 3,509,958 | 5/1970 | Lang ..................................... 180/133 |
| 3,865,211 | 2/1975 | Liebert ................................. 180/153 |

Primary Examiner—John A. Pekar
Attorney, Agent, or Firm—Watts, Hoffmann, Fisher & Heinke Co.

[57] ABSTRACT

A vehicle power steering system which effects steering with a pair of fluid actuated cylinders, one cylinder being operatively connected to each steerable wheel. Each cylinder is normally powered independently of the other cylinder so that both cylinders steer the vehicle. A pressurized fluid flow from a single source is divided for parallel flow along companion fluid flow paths to the indivdual cylinders. In response to a predetermined pressure decrease sensed in one of those fluid flow paths a pressure responsive fluid diverter automatically diverts fluid flow from the reduced pressure flow path to the companion path so that all pressurized fluid in the system is then utilized to power one of the cylinders.

11 Claims, 1 Drawing Figure

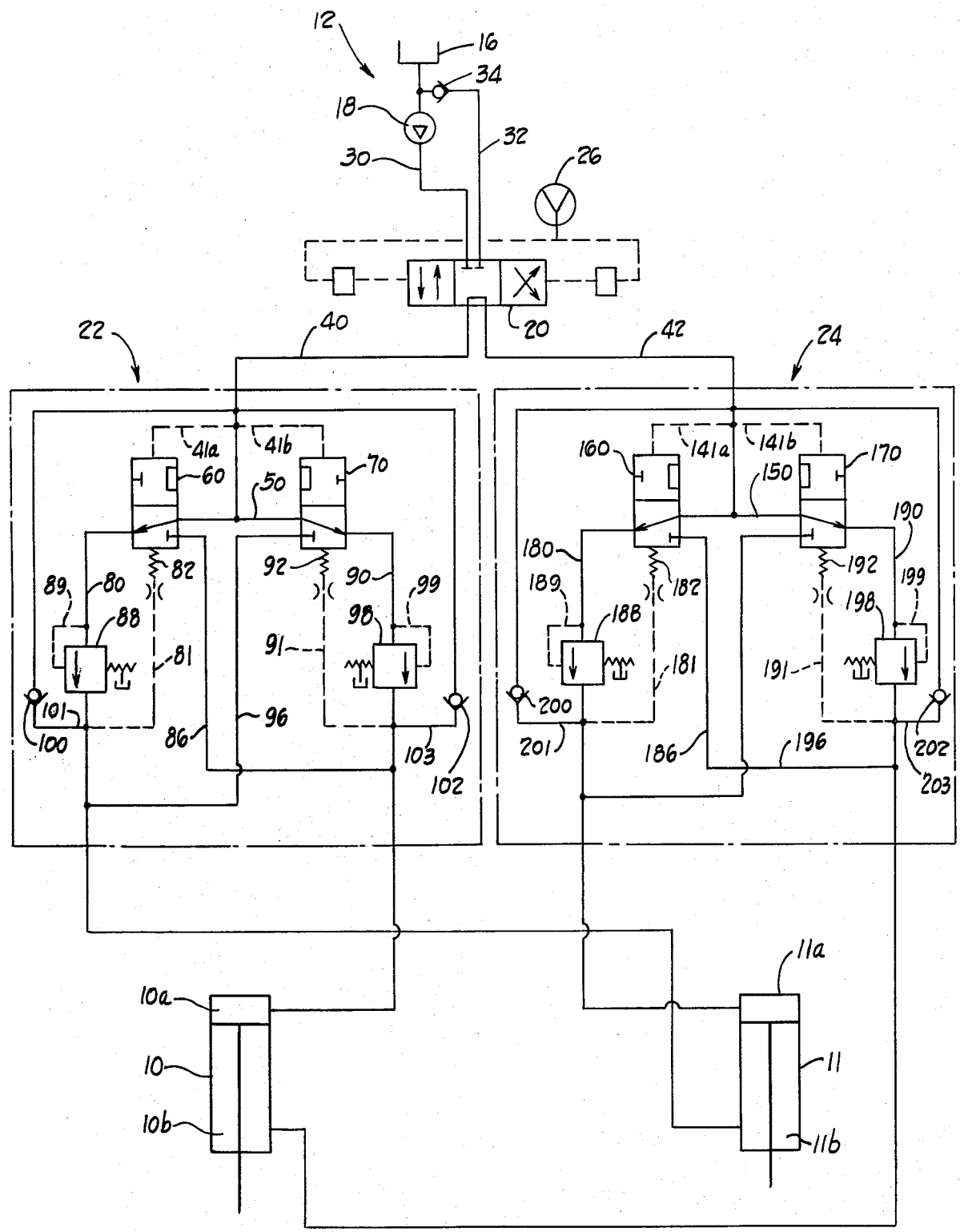

VEHICLE POWER STEERING SYSTEM

BACKGROUND OF THE INVENTION

This invention relates generally to fluid power systems and more particularly to a fluid power assisted steering system for a vehicle.

A prior art fluid power assisted vehicle steering system typically includes a pair of fluid actuated cylinders connected to vehicle wheels, a fluid reservoir, and a pump for pressurizing fluid in the system. An operator responsive control valve is in the system for controlling fluid flow to the cylinders selectively to effect vehicle steering. Fluid flow lines connect the system's components and define one or more continuous fluid circuits.

There have been proposals for systems which will remain operative even though a portion of such system is either damaged and non-functioning or malfunctioning. A problem which these proposals have sought to overcome is rupture of a fluid line with consequent loss of all or substantially all of the pressurized fluid in the system. Such proposals have included independent fluid circuits or isolatable circuit sections. Should damage occur to one circuit or circuit section, that damaged circuit or section is to be isolated from the rest of the system. The remainder of the system is to remain integral and retain as much of the system's fluid as possible. There have been proposals for circuit isolation which take place either manually or automatically.

One proposed power steering system incorporating an automatic cutoff for an independent circuit is disclosed in U.S. Pat. No. 3,865,211 issued to Liebert et al. Liebert et al discloses a two cylinder system where the cylinders are disposed in a series fluid flow relation. When the vehicle is steering, pressurized fluid is directed from the pump to only one of the cylinders and that cylinder powers the vehicle steering.

During normal operation a primary circuit conducts pressurized fluid from the pressurized fluid source to one chamber of the appropriate one of the cylinders and a fluid reservoir receives fluid back from one chamber of the other cylinder.

In response to pressurized fluid entering and leaving the cylinder chambers communicating with the pressurized fluid source, a secondary circuit acts as a slave circuit merely shifting fluid back and forth between the cylinder chambers which are not communicating with the pressurized fluid source.

Should there be a rupture in a portion of the circuit conducting pressurized fluid between the pressurized fluid source and either of the cylinders, that circuit portion and the associated cylinder are automatically cut out of the circuit and the pressurized fluid normally conducted through that portion is diverted to the slave circuit and passes to the chamber of the other cylinder communicating with that slave circuit.

SUMMARY OF THE INVENTION

By this invention, fluid power system is provided which includes a pair of reversible actuators disposed in a parallel fluid flow arrangement. Normally, both actuators are simultaneously and independently powered by a source of pressurized fluid. A first pair of companion fluid flow paths connect the reversible actuators and the pressurized fluid source with each flow path being connected to a distinct one of the actuators. Pressurized fluid, to power each actuator flows along each flow path from the pressurized fluid source to its actuator. One form of actuation is produced. In response to fluid flow into the actuators, fluid is exhausted from the actuators along a similar second pair of parallel, companion flow paths. When reverse actuation is desired a control valve reverses flow in the fluid flow path pairs. Each pair of companion flow paths are interconnected with pressure responsive valves.

If a substantial pressure decrease should occur in one flow path, the pressure responsive valve interconnecting that flow path and the companion flow path would sense the pressure decrease and divert pressurized fluid from the reduced pressure flow path to and through the companion flow path to the working actuator. Thus, one actuator ceases receiving fluid under pressure while the other actuator receives the combined pressurized fluid flows in the system and is capable of increased work output to maintain substantial power steering capability in the vehicle.

In one embodiment the pressure responsive valve comprises a two position 3-way flow control valve disposed in each of the companion fluid flow paths.

DESCRIPTION OF THE DRAWINGS

FIG. 1 illustrates a fluid power system incorporating features of this invention with its control valve shown in a neutral position.

DESCRIPTION OF THE PREFERRED EMBODIMENT

Referring to FIG. 1, a fluid power system is illustrated which incorporates features of this invention. Generally, the system is seen to comprise a pair of reversible actuators 10, 11 in the form of hydraulic cylinders which are connected in a parallel fluid flow relationship with respect to each other and with respect to a source of pressurized fluid, generally indicated at 12. Pressurized fluid flows to the actuators 10, 11 from the source 12, first by way of a control valve 20, and then by way of either one of two diverter valves 22, 24 which are connected in series fluid flow relationship with the control valve 20. The control valve 20 controls which one of the two diverter valves 22, 24 receives the pressurized fluid flowing from the source.

Each diverter valve is capable of dividing such flow between two companion flow paths. Each such flow path communicates with a distinct one of the actuators 10, 11. When the control valve 20 sends pressurized fluid through the diverter valve 22 to both the actuators, those actuators produce one type action. When the control valve 20 sends the pressurized fluid through the other diverter valve 24 to the actuators, those actuators produce the reverse action. Each diverter valve is responsive to a pre-determined decrease in pressure in each of its companion flow paths. Such a pressure decrease causes the diverter valve to divert pressurized fluid from the reduced pressure flow path to its companion flow path and to the actuator connected to that companion flow path. Thus, in the event of a rupture of a fluid conduit transporting fluid to one of the actuators, the inoperability of that actuator does not prevent the system from functioning and fluid loss is minimized. In addition, increased power output of the other actuator is achieved by combining the diverted fluid flow with the pressurized fluid normally flowing to that operable actuator and obtaining an increased work output from it.

In one application the fluid power system incorporating features of this invention may be embodied in a vehicle steering apparatus. Each of the actuators 10, 11 is connected to a wheel of a vehicle. Each of the actuators 10, 11 comprises a fluid cylinder defining non-communicating chambers 10a, 10b and 11a, 11b at opposed ends of the cylinder. The cylinders 10, 11 are connected to their respective vehicle wheels so that the simultaneous delivery of pressurized fluid to a particular chamber in each cylinder causes both cylinders to produce steering action.

The fluid pressure source 12 includes a reservoir 16 which is connected to the control valve 20 by a conduit 30. A pump 18 is disposed in the conduit 30 to pressurize fluid passing through the conduit 30 to the control valve 20. A conduit 32 conducts fluid exiting the control valve 20 back through a check valve to the reservoir and to the conduit 30. The control valve 20 is a 4-way, 3 position valve which controls which of the diverter valves receives the pressurized fluid flowing from the source 12. The valve has a neutral position and a pair of fluid conducting positions. One of the fluid conducting positions conducts pressurized fluid from conduit 30 to the diverter valve 22 and returns fluid from diverter valve 24 to the conduit 32. The other fluid conducting position conducts pressurized fluid from the conduit 30 to the diverter valve 24 and returns fluid from the diverter valve 22 to the conduit 32.

The control valve 20 is shiftable between its three positions in response to the rotation of a steering wheel 26 which may be operatively interconnected with said valve 20 in any suitable manner. Operators 28, 29 interconnecting the steering wheel 26 and the valve 20 are illustrated.

The diverter valves 22, 24 are identical valves which divide any pressurized fluid passing to them from the control valves along a pair of companion fluid flow paths. One path of each pair is connected to a port of one of the actuators and the companion path of the pair is connected to a port of the other actuator.

The diverter valve 22 is connected to the control valve 20 by a conduit 40. The conduit 40 intersects a conduit 50 which connects a pair of similar two position, three way pressure responsive flow control valves 60, 70 and which divides fluid flow from the conduit 40 between the valves 60, 70.

The valve element in the valve 60 is movable between a first position wherein the conduit 50 communicates with a conduit 80 and a second position wherein the conduit 50 communicates with a conduit 86. The valve element in the valve 70 is similarly movable between a first position wherein the conduit 50 communicates with a conduit 90 and a second position wherein the conduit 50 communicates with a conduit 96.

The valves 60, 70 are maintained in their first position when the lines 40, 80, and 90 are normally pressurized. Position control passages in the form of pilot lines 41a, 41b extend from the conduit 40 to the valves 60, 70. A system sensing flow passage in the form of a pilot line 81 extends from the conduit 80 to the valve 60. Another system sensing flow passage in the form of a pilot line 91 extends from the conduit 90 to the valve 70. The pilot pressure in the pilot line 81 and a resilient member 82 act in concert on the valve 60 and in opposition to the pilot pressure in the pilot line 41a. The pilot pressure in the pilot line 91 acts in concert with a resilient member 92 on the valve 70 and in opposition to the pilot pressure in the line 41b. When the conduits 40, 80, 90 are normally pressurized, the forces generated by the pilot pressures in the pilot lines 81, 91 in combination with their resilient members 82, 92, respectively, are sufficient to overcome, the forces generated by the pilot pressures in the lines 41a, 41b.

Should the pilot pressure in either of the lines 81, 91 be reduced below some predetermined limit, the pilot pressure in the other pilot line 41a, 41b acting on that same valve 60, 70 will be sufficient to move the valve 60, 70 into its second position.

The conduits 80, 90 form a companion pair of conduits arranged in parallel fluid flow relation with respect to each other. They are provided to connect each of the valves 60, 70 to a separate one of the cylinders 10, 11. The conduit 80 is connected to a chamber 11b in one end of the cylinder 11 while the conduit 90 is connected to a chamber 10a in one end of the cylinder 10.

Crossover conduits 86, 96 are provided to communicate each of the valves 60, 70 in the conduits 80, 90 with the companion conduit 90, 80 when the valves 60, 70 are in their second positions.

To assure that the valves 60, 70 are shiftable, sequencing valves 88, 98 are preferably disposed in the respective conduits 80, 90. These sequencing valves are utilized to generate a bias pressure. Such valves normally will block the conduits 80, 90 until sufficient pressure is generated in the pilot lines of 89, 99 to shift the sequencing valves from a fluid conduit obstructing position to a fluid conduit conducting position.

A check valve bypass is provided around each of the valves 60, 70 and their sequencing valves, 88, 98 to provide return flow paths through the diverter valve 22 for fluid exhausted from the cylinders 10, 11. The bypasses each comprise check valves 100, 102 disposed in bypass conduits 101, 103. The conduits 101, 103 each intersect the respective conduits 80, 90 intermediate the sequencing valves 88, 98 and the cylinders 11, 10 and intersect the conduit 40 intermediate the control valve 20 and the valves 60, 70.

Referring to the diverter valve 24, a similar arrangement is shown. The conduit 42 communicates with a conduit 150 which connects a pair of similar two position, three way pressure responsive flow control valves 160, 170 and which divides fluid flow from the conduit 42 between the valves 160, 170.

The valve element in the valve 160 is movable between a first position wherein the conduit 150 communicates a conduit 180 and a second position wherein the conduit 50 communicates with a conduit 186. The valve element in the valve 170 is similarly movable between a first position wherein the conduit 150 communicates with a conduit 190 and a second position wherein the conduit 150 communicates with a conduit 196.

A pair of position control passages in the form of pilot lines 141a, 141b extend from the conduit 42 to the respective valves 160, 170 and tend to urge those valves into their second position. A pair of system sensing flow passages in the form of pilot lines 181, 191 extend from the conduits 180, 190 to the respective valves 160, 170 and act in concert with resilient members 182, 192 to urge the respective valves 160, 170 toward their first position. When the conduits 180, 190 are normally pressurized, the valves 160, 170 are in their first positions, and the conduit 150 communicates with the conduits 180, 190. When the conduits 180, 190 are not normally pressurized the valves 160, 170 communicate with the conduits 190, 180 respectively through a pair of crossover conduits 186, 196.

The conduits 180, 190 form a companion pair of conduits arranged in parallel fluid flow relation with respect to each other. They are provided to connect each of the valves 160, 170 to a separate one of the cylinders 10, 11. The conduit 180 communicates with the chamber 11a of the cylinder 11 while the conduit 190 communicates with the end 10b of the cylinder 10.

Sequencing valves 188, 198 are disposed in the conduits 180, 190. Check valve bypasses are also provided around each of the valves 160, 170 and their sequencing valves 188, 198. The bypasses comprise check valves 200, 202 disposed in bypass conduits 201, 203 which communicate the conduits 180, 190 with conduit 42.

In the operation of this system, when the control valve 20 is in its neutral position, no pressurized fluid is conducted from the source 12 to the circuit. When the steering wheel 26 is turned in one direction the control valve 20 is moved to one of its conducting positions and pressurized fluid is conducted from the pump 18 through the conduit 30 to the conduit 40 and into the diverter valve 22. That pressurized fluid is divided by the conduit 50 and passes through both of the companion valves 60, 70 to the respective conduits 80, 90. Sufficient pressure is generated in the conduits 80, 90 to pressurize the pilot lines 89, 99 and shift the sequencing valves 88, 98 from a flow obstructing to a flow enabling position. Pressurized fluid flow then passes along the respective conduits 80, 90 to the cylinder chambers 11b, 10a.

Simultaneously with fluid entering the cylinder chambers 11b, 10a other fluid will be evacuated from the cylinder chambers 10b, 11a through the conduits 190, 180 and the bypasses 201, 203 in the diverter valve 24. The two flowing portions of evacuated fluid will combine in the conduit 42 and pass through the valve 20 to the conduit 32 for recirculation. This fluid flow through the diverter valves causes the vehicle to turn in one direction.

When the steering wheel 26 in the opposite direction, the valve 20 is moved to the other of its conducting positions. Fluid then flows in the opposite direction through the diverter valves to the cylinders.

If there is a rupture of one of the fluid conduits conducting fluid to the cylinders 10, 11 the fluid in that conduit will be diverted to the companion conduit which is continuously conducting fluid to its own cylinder. The result of course, is that an increased amount of pressurized fluid will be conveyed to the operating cylinder to increase its work output and maintain steering of the vehicle until it can be brought to a stop. Only a minimal amount of fluid will be lost because of a rupture.

The operation of the system in the event of a fluid conduit rupture is illustrated by assuming that the control valve 20 is conducting pressurized fluid from the conduit 30 into the conduit 40 and the diverter valve 22. The conduit 80, would normally conduct pressurized fluid to the cylinder chamber 11b. If the conduit 80 ruptures at some point between the diverter valve 22 and the cylinder 11, the diverter valve 22 will divert the pressurized fluid in the conduit 80 to the companion conduit 90. Thus, the diverted pressurized fluid will combine with the pressurized fluid normally flowing in the companion conduit 90 and flow to the cylinder 10 to maintain vehicle steering capability.

More specifically, when a rupture takes place in the conduit 80, the pilot pressure in the pilot line 81 is substantially reduced and the pilot pressure in the pilot line 41a causes the valve 60 to be shifted from its first position to its second position. Fluid in the conduit 40 is directed by the valve 60 into the conduit 86 which carries the diverted fluid to the companion conduit 90 where these fluids join and together flow to the chamber 10a of the cylinder 10.

Similarly if a break should appear in the conduit 90 between the diverter valve 22 and the cylinder 10, a similar diverting action would be carried out by the three way flow control valve 70 to direct fluid through the conduit 96 to the conduit 80 to combine with other pressurized fluid flowing through that conduit into the cylinder chamber 11b.

An analgous fluid diverting action is performed in the diverter valve 24 if the fluid exiting the control valve 20 should pass to the valve 24 and if a conduit rupture should occur in either of the companion conduits 180, 190.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A hydraulic power assist vehicle steering circuit, comprising:
   (a) a source of pressurized fluid including a reservoir of fluid;
   (b) a direction control valve for alternatively directing such pressurized fluid through the circuit for steering in opposite directions;
   (c) first and second hydraulic cylinders disposed in said circuit in parallel fluid conducting relationship and each having head and rod ends;
   (d) a pair of diverter valves disposed in a series flow relationship with said direction control valve, each of said diverter valves including means for dividing fluid flow from said direction control valve;
   (e) one of the diverter valves including first and second companion fluid conduits, said first conduit being for transporting one portion of the divided flow to the head end of the first cylinder and the second conduit being for transporting another portion of that divided flow to the rod end of the second cylinder;
   (f) the other of the diverter valves including third and fourth companion fluid conduits, the third conduit being for transporting one portion of the divided flow from the other diverter valve to the rod end of the first cylinder and the fourth fluid conduit being for transporting another portion of that divided flow to the head end of the second cylinder;
   (g) said diverter valves each further including means responsive to a substantial decrease in fluid pressure in either of the fluid conduits to divert fluid flow from the conduit of decreased pressure to its companion conduit; and,
   (h) a means to return fluid exhausted by the hydraulic cylinders to the fluid reservoir.

2. A hydraulic circuit comprising:
   (a) a pair of fluid actuators;
   (b) a source of fluid under pressure;
   (c) a plurality of conduits connecting the source to the actuators to supply fluid under pressure to the actuators and effect work and to return fluid from the actuators to the source;

(d) fluid control means in fluid communication with said conduits for sensing a pressure drop in a conduit;

(e) said fluid control means including a diverting means to divert fluid under pressure from one conduit to another conduit supplying fluid to one actuator when pressure in the one conduit normally supplied to the other actuator is reduced due to a fracture in the one conduit or the like and to terminate flow to the other actuator whereby excessive loss of fluid intended for flow to the other actuator is prevented and the work output of the one actuator is increased to compensate for lost work output of the other.

3. The circuit of claim 2 wherein the fluid control means comprises a pair of diverter valves.

4. The circuit of claim 2 wherein the circuit is a power steering circuit which includes a direction control valve.

5. A fluid power assist vehicle steering system, comprising:
 (a) a pair of fluid actuators;
 (b) a source of pressurized fluid for actuating said actuators including a reservoir;
 (c) control valve means for controlling the direction of fluid flow to and from said actuators to effect steering in a desired direction;
 (d) first and second diverter valves disposed in a series fluid flow relationship with said control valve means, each said diverter valve including a pair of companion fluid flow paths, each path of said pair of companion flow paths communicating with a distinct actuator;
 (e) each diverter valve including flow means for dividing fluid flow from said control valve means to concurrently provide fluid to each path of one or the other of the pairs of companion fluid flow paths;
 (f) one of the flow paths of the first diverter valve pair of companion fluid flow paths being in communication with a first end portion of one of the said cylinders and the other being in communication with a first end portion of the other cylinder;
 (g) one of the flow paths of the second diverter valve pair of companion fluid flow paths being in communication with the second end portion of the one cylinder and the other being in communication with the second end portion of the other cylinder.
 (h) each diverter valve further including a pressure responsive means to divert the fluid flow, should pressure fall below a predetermined value in either of its parallel companion flow paths due to conduit fracture or the like, from the path of decreased pressure to the other path; and,
 (i) conduit means to return fluid exhausted by the fluid actuators to the reservoir.

6. The system of claim 5 wherein the said pressure responsive means contained in each diverter valve includes a pair of multi-positon 3-way pressure dependent flow control valves each serially placed in a different one of the companion fluid flow paths and each said multi-position 3-way flow control valve being shiftable between a first position wherein the pressurized fluid is allowed to proceed down the companion flow path in which the multi-position 3-way valve is serially placed and a second position wherein the pressurized fluid is diverted to the other companion flow path.

7. The system of claim 6 and further comprising means for bypassing each said multi-position 3-way valve with fluid, being exhausted from one of said cylinders to said control valve along the flow path containing that valve.

8. The system of claim 6 wherein each said multi-position 3-way valve includes resilient means and coacting first fluid means for cooperatively biasing said multi-position 3-way valve towards its first position and second fluid means for biasing said multi-position 3-way valve towards its second position, said first fluid means responsive to fluid pressure in the fluid flow path downstream of that multi-position 3-way valve between that 3-way valve and the cylinder to which it is connected, said second fluid means responsive to fluid pressure upstream of that multi-position 3-way valve between that 3-way valve and said control valve means.

9. The system of claim 6 and further comprising a two position sequencing valve disposed in fluid flow relation in each companion fluid flow path intermediate the multi-position 3-way valve and the cylinder associated with that path, each said sequencing valve being resiliently biased toward a first position in which fluid flow along the flow path is interrupted, each said sequencing valve being responsive to the fluid pressure above a pre-determined value of fluid flowing to the sequencing valve from the multi-position 3-way valve, to bias said sequencing valve toward a second position in which such fluid flow is enabled.

10. A fluid power system, comprising:
 (a) a pair of reversible fluid actuators;
 (b) a source of pressurized fluid for actuating said actuators, the source including a reservoir;
 (c) control valve means for controlling the direction of fluid flow to and from said actuators to effect operation in a desired direction;
 (d) first and second diverter valves disposed in a series fluid flow relationship with said control valve means, each said diverter valve including a pair of companion fluid flow paths, each path of each pair of companion flow paths communicating with a different one of said actuators;
 (e) each diverter valve including flow means for dividing fluid flow from said control valve means to concurrently provide fluid to each of the companion fluid flow paths of its diverter valve;
 (f) one of the companion flow paths in said first diverter valve communicating with a first port in one said actuator and the other companion flow path of the first diverter valve communicating with a first port in the other actuator;
 (g) one of the companion flow paths in said second diverter valve communicating with a second port in said one actuator and the other companion flow path of the second diverter valve communicating with a second port in said other actuator;
 (h) each diverter valve further including a pressure responsive means to divert the fluid flow, should pressure fall below a predetermined value in either of its companion flow paths due to conduit fracture or the like, from the path of decreased pressure to the other path, and
 (i) the system including conduit means to return fluid exhausted by the actuators to the fluid reservoir.

11. In a fluid power assist vehicle steering system of the type including a pair of fluid actuators, a reservoir of pressurized fluid, and a valve means for controlling the direction of fluid flow to and from said actuators to effect steering in a desired direction, the improvement comprising:

(a) first and second diverter valves disposed in a series fluid flow relationship with said valve means, each said diverter valve including a pair of companion fluid flow paths, each path of each pair of flow paths communicating with a different actuator;

(b) each diverter valve including flow means for dividing fluid flow from said valve means to concurrently provide fluid to each of the companion fluid flow paths in its diverter valve;

(c) one of the flow paths of the said pair of companion fluid flow paths in the first diverter valve communicating with an actuator port for steering in one direction and the other flow path of the first diverter valve communicating with a port of the other actuator for steering in the same direction;

(d) one of the flow paths of the said pair of companion fluid flow paths contained in the second diverter valve communicating with the second port of the one actuator and the other flow path of the second diverter valve communicating with a port of the other actuator for steering in the other direction;

(e) each said diverter valve further including a pressure responsive means to divert the fluid flow, should pressure fall below a predetermined value in either of its companion flow paths due to conduit fracture or the like, from the path of decreased pressure to the other path; and, (f) the system including conduit means to return fluid exhausted by the actuators to the fluid reservoir.

* * * * *